United States Patent
Doty

[11] Patent Number: 5,265,823
[45] Date of Patent: Nov. 30, 1993

[54] TENSION RELIEVING MECHANISM FOR A SAFETY BELT SYSTEM

[75] Inventor: Gerald A. Doty, Crown Point, Ind.

[73] Assignee: Takata Inc., Auburn Hills, Mich.

[21] Appl. No.: 709,594

[22] Filed: Jun. 3, 1991

[51] Int. Cl.$^5$ ............................................. B60R 22/44
[52] U.S. Cl. ..................................................... 242/107
[58] Field of Search .................. 242/107, 107.4 R; 280/806, 807; 297/474–476, 478

[56] References Cited

U.S. PATENT DOCUMENTS

| | | | |
|---|---|---|---|
| 3,834,646 | 9/1974 | Heath | 242/107.7 |
| 3,851,836 | 12/1974 | Sprecher | 242/107.7 |
| 3,869,098 | 3/1975 | Sprecher | 242/107.4 |
| 4,026,494 | 5/1977 | Tanaka | 242/107 |
| 4,108,393 | 8/1978 | Henderson | 242/107 |
| 4,303,208 | 12/1981 | Tanaka | 242/107 |
| 4,361,291 | 11/1982 | Ellis et al. | 241/79 |
| 4,452,470 | 6/1984 | Doty | 280/802 |
| 4,461,493 | 7/1984 | Doty | 280/807 |
| 4,498,642 | 2/1985 | Doty | 242/107.4 A |
| 4,585,185 | 4/1986 | Ueda | 242/107 |
| 4,919,450 | 4/1990 | Doty et al. | 280/802 |
| 5,131,594 | 7/1992 | Refior et al. | 242/107 |

Primary Examiner—Daniel P. Stodola
Assistant Examiner—John Q. Nguyen
Attorney, Agent, or Firm—Fitch, Even, Tabin & Flannery

[57] ABSTRACT

A safety belt system having a retraction spring and a tension-relieving apparatus having a second spring operable to provide a retractive force reducing the belt-applied tensile load on the occupant to an unnoticeable level but adequate to rewind the belt and remove any belt slack, which apparatus is engageable by the occupant after securing the belt.

12 Claims, 3 Drawing Sheets

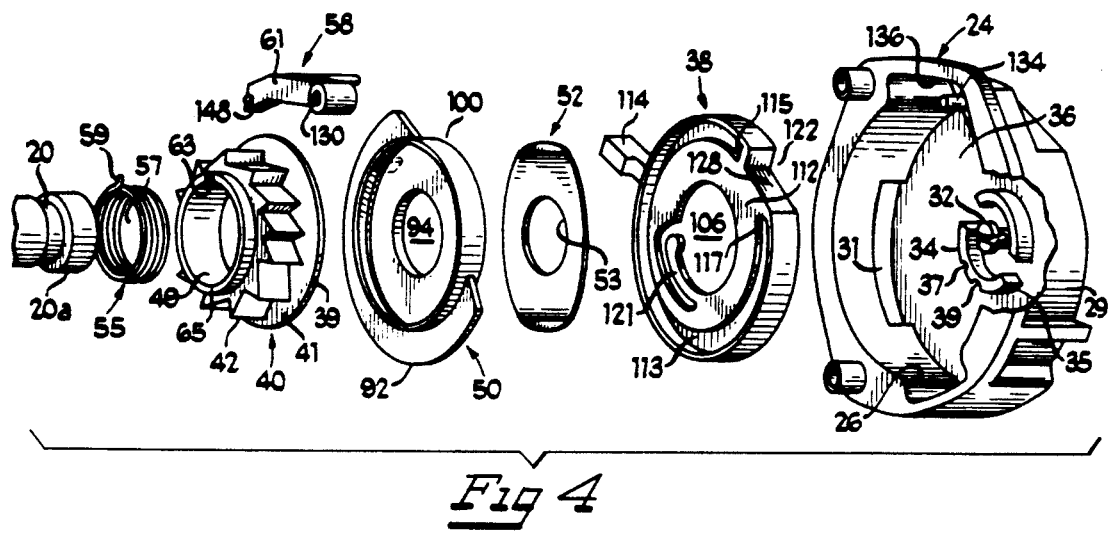
Fig 4
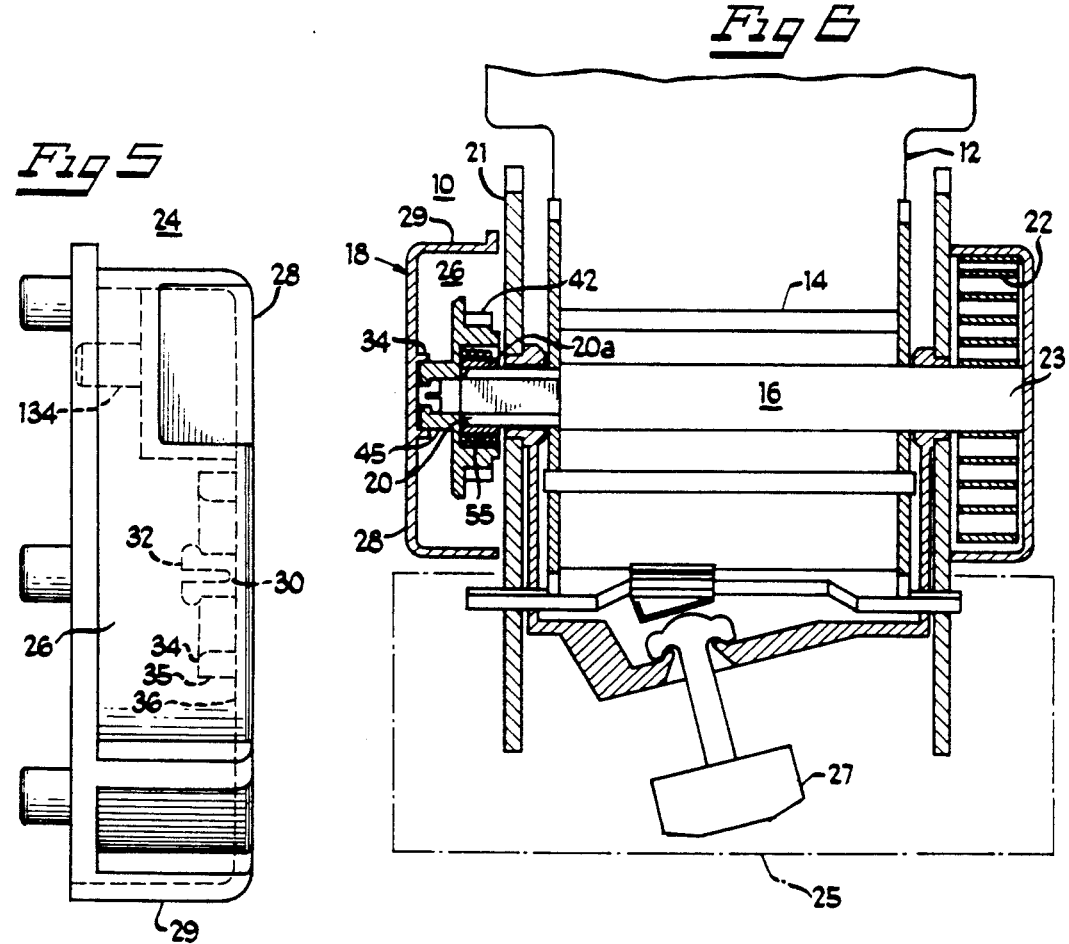
Fig 5
Fig 6

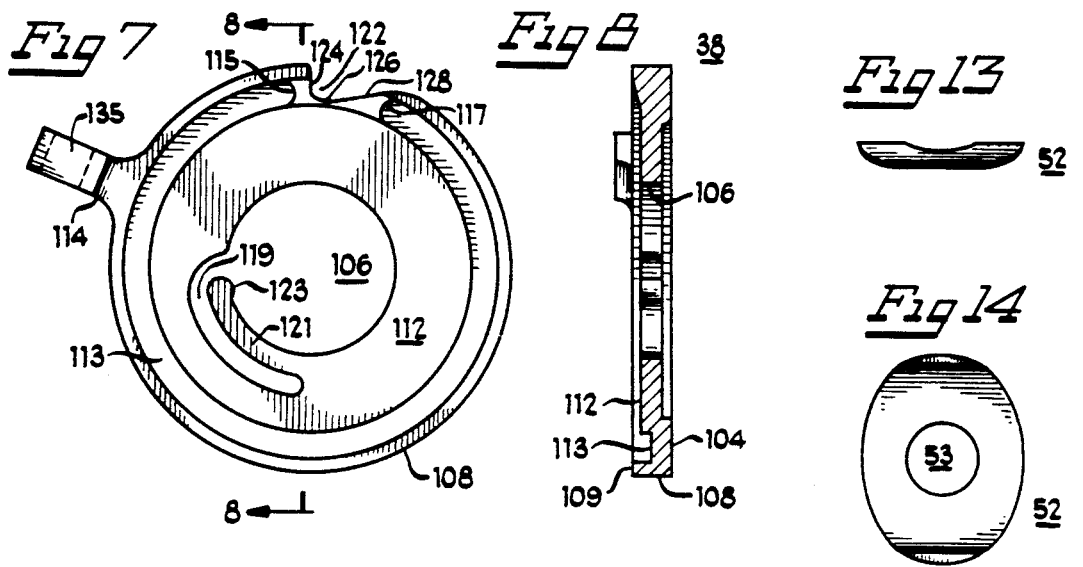
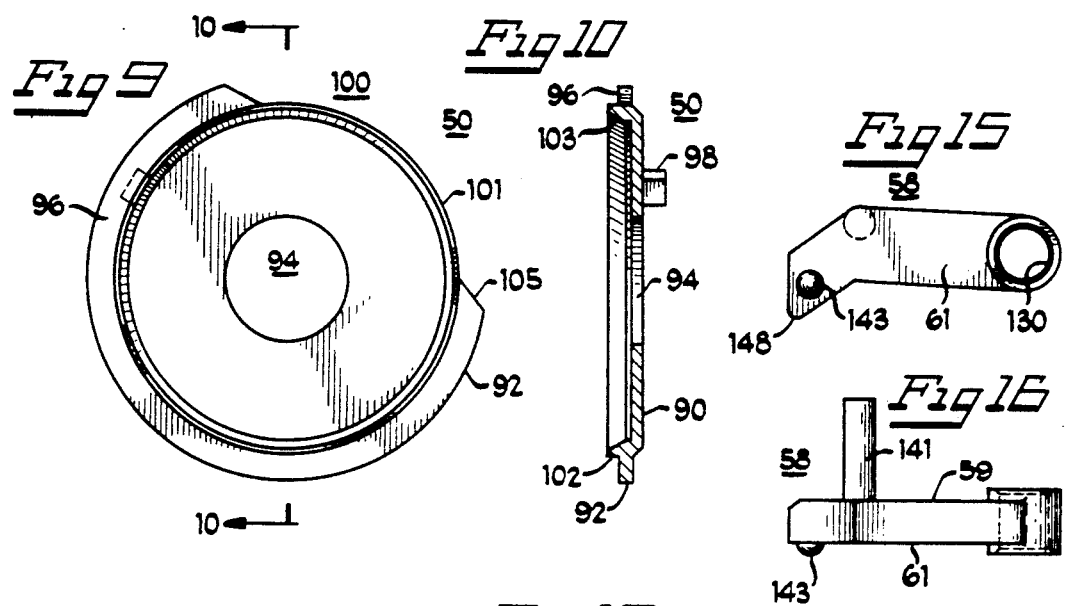
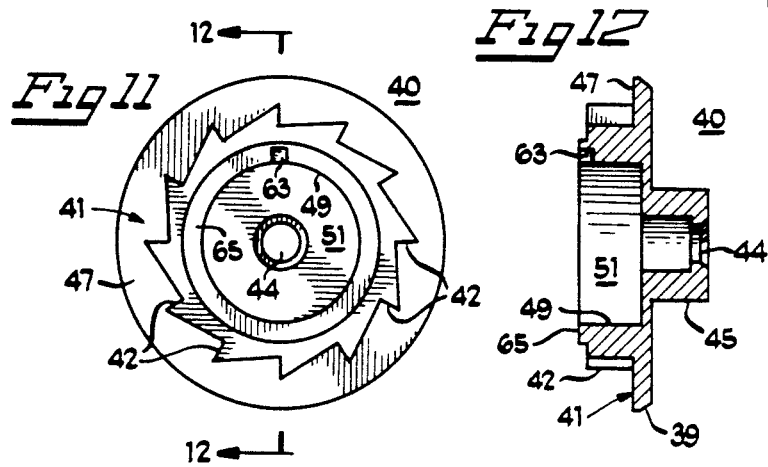

TENSION RELIEVING MECHANISM FOR A SAFETY BELT SYSTEM

BACKGROUND OF THE INVENTION

The invention relates to a safety belt system having a tension-relieving mechanism and more specifically to a belt system with a tension-relieving mechanism continuously applying a nominal load on the wearer in the tension-relieving mode.

Tension-relieving mechanisms are frequently placed into the tensionless or comfort mode by protracting the latched or secured seat belt and releasing the belt to allow a slight belt-rewind movement. This sequence of actions in a known tension-relieving system moves an internal locking pawl to engage a ratchet wheel fixed to the reel shaft, which prevents continued rewinding of the belt onto the reel under the force of the reel biasing means. Thus, the force of the rewind spring acting to rewind the shoulder belt is relieved from a vehicle occupant's shoulder. Such devices are shown in U.S. Pat. Nos. 3,851,836; 3,869,098; and, 3,834,646. The conventional tensionless mechanisms frequently have a memory system, which allows the occupant to move slightly forward a short distance in his seat to extract one or two inches of seat belt from the retractor without canceling the tensionless mode. Thus, if the occupant moves forward in his seat and then returns to the original tensionless position, the tension-relieving pawl again engages a ratchet wheel to relieve the belt tension from the rewind spring. Protracting the seat belt more than the memory distance shifts the tension-relieving mechanism to its disengaged or release position, which allows the rewind spring to freely act on the reel to tightly rewind the belt against the occupant. A door release operator may similarly disable the tension-relieving mechanism and allow the retractor spring to rewind the seat belt toward its fully wound position on the seat belt reel. This assures that seat belts are fully wound upon an occupant's leaving the vehicle.

Other actuator systems for tension-relieving may be set into their tensionless state by an overt act of the occupant, such as moving a switch to close a circuit and energize a solenoid. This solenoid shifts a pawl into locking engagement with a ratchet wheel to immediately place the tensionless system into its tension-relieving state, irrespective of occupant location. Thus, if one or more inches of slack are in the belt when the actuator means is engaged, the amount of belt slack is not reduced even through the occupant may move back in the seat. Such a tensionless system was disclosed in U.S. Pat. No. 4,585,185, and it is released or disengaged by a subsequent operation of a switch means. Manipulation of the belt beyond the memory distance will not cause automatic rewinding of the belt in this system, as the solenoid has shifted the tension-relieving pawl into its engaging position and an electrical switch operation is required to switch the solenoid to another state.

The present invention provides a tensionless system for a seat belt retractor assembly and more specifically provides a tensionless system which reduces the overall retractive load upon the vehicle occupant restrained by the seat belt to less than the total retractive force. However, the small retractive load at the tension-relieving mode, which is provided at assembly, maintains the belt firmly but unobtrusively against the occupant. The tensionless or tension-relieving system is not immediately set into the tensionless mode by a belt movement, but is generally set into the tensionless mode by protracting the belt a small supplemental distance from the housing after belt securement and initial retraction against the body of the vehicle occupant. The tension-relieving mode is actuable by either the conscious movement of the occupant to extract or protract the belt the fixed distance, or alternatively, an inadvertent forward movement of the passenger to protract the belt the required tensionless-mode-setting distance. The tension-relieving mode reduces the retractive load on the belt, and thus the belt tensile load felt by the occupant, to a level that secures the occupant with the belt against his body but prevents any looseness or slack in the belt while in the tensionless state. The tensionless mechanism further incorporates a comfort system with a memory for recovery of the tensionless mode and means for canceling the tensionless mode, which may be actuated by a remote operator or by belt disengagement.

SUMMARY OF THE INVENTION

The present invention provides a tensionless system for a seat belt retractor assembly. The system utilizes a tensionless or belt-tension relieving mechanism, which is activated by belt manipulation or protraction to move the belt-tension relieving mechanism to the tensionless state or position. The mechanism is initially disengaged from the tensionless state and the belt rewinds to the retracted position after securement across the body of the occupant. Subsequent protraction of the belt a short distance transfers the belt and the tensionless mechanism to the tensionless state, where the retractive force on the belt is reduced to a level securely holding the belt against the shoulder of the occupant without slack. The tensionless mechanism includes a memory, that is, protraction of the belt beyond the tensionless mode "a short distance" but less than a predetermined distance, will allow the belt to return to the tensionless state. However, belt protraction beyond the predetermined distance disengages the belt from the tensionless mode and returns the retractor to the reference mode with the retractor spring acting to rewind the belt.

The tensionless mechanism comfort system permits wearer protraction of the belt a fixed distance before release of the tensionless mode, and the memory of the tensionless system allows recovery to the tensionless state. The mechanism includes a lever or arm extending through the tensionless housing for coupling to a remote apparatus, such as the car door, for canceling of the tensionless mode and retraction of the belt at its disengagement. In addition, disengagement of the belt without opening of the car door will similarly permit retraction of the belt to the housing, and, as noted above, belt protraction beyond the comfort memory distance automatically shifts the retractor into the release state for belt protraction. The tensionless or tension-relieved mode can be reset by belt protraction after retractor return to the reference position.

The tensionless mechanism is relatively compact and incorporates components which are easily manufactured and not subject to excessive wear. The easily operable mechanism lends itself to integration onto an extant retractor assembly. The above attributes of the mechanism are complementary to the fundamental function of a retractor mechanism. This apparatus provides a retractor mechanism with a comfort system while avoiding any excess slack material extending across the user's body by firmly but almost unnoticeably securing the belt against him with only a nominal tensile force.

BRIEF DESCRIPTION OF THE DRAWINGS

In the Figures of the drawings, like reference numerals identify like components and in the drawings:

FIG. 4 is an exploded view of the tension-relieving apparatus in FIG. 3;

FIG. 5 is a side view of the cover in FIG. 4;

FIG. 6 is an elevational view in cross-section of the tensionless apparatus and a retractor assembly;

FIG. 7 is a plan view of the unlocking disc of the apparatus shown in FIG. 4;

FIG. 8 is a sectional view of the unlocking disc taken on line 8—8 of FIG. 7;

FIG. 9 is a plan view of the locking disc of the apparatus shown in FIG. 4;

FIG. 10 is a sectional view of the locking disc taken on line 10—10 of FIG. 9;

FIG. 11 is a plan view of the ratchet member of the apparatus shown in FIG. 4;

FIG. 12 is a sectional view of the ratchet member taken on line 12—12 of FIG. 11;

FIG. 13 is a side view of the disc-spring or washer of the apparatus shown in FIG. 4;

FIG. 14 illustrates a plan view of the disc-spring in FIG. 13;

FIG. 15 is a side view of the pawl of the apparatus shown in FIG. 4; and,

FIG. 16 is a top view of the pawl in FIG. 15.

DETAILED DESCRIPTION OF THE PREFERRED EMBODIMENT

The present invention relates to a seat belt retractor assembly generally used in automobile safety systems. More particularly, the invention provides a retractor having a belt-engageable, tensionless or tension-relieving mode incorporating an apparatus to remove belt slack in the tensionless mode by maintaining a minimal retraction force on the belt.

Figure 1:
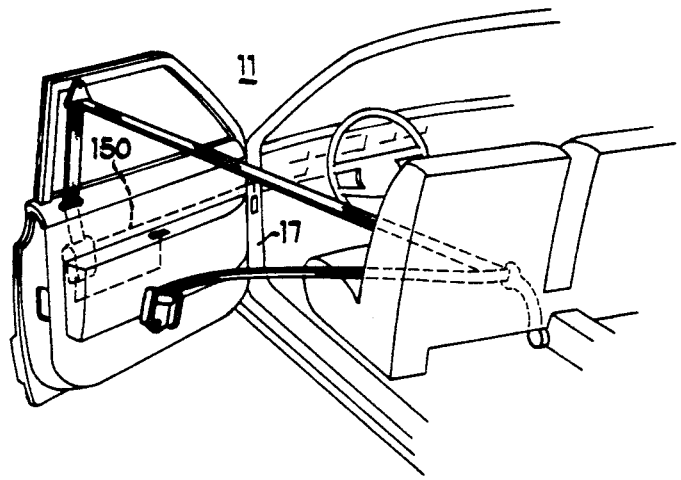
FIG. 1 is a perspective view of a representative safety belt and retractor assembly in a vehicle.

Seat belt retractor assemblies 11, as illustrated in an exemplary automobile application in FIG. 1, are utilized to rewind safety belts and frequently incorporate a tensionless apparatus to alleviate the rewind force on the occupant, which is applied by a retraction spring to rewind the belt. The tensionless mode in many apparatus completely disables the retractive bias force over a small range of seat belt protraction, which results in at least some looseness or slack in the secured belt. This slack is noted to be uncomfortable or awkward to some wearers and is disquieting to others, as they are uneasy in this slack-belt condition.

The present invention is directed to a seat belt retractor assembly 10, as shown in FIG. 6, and more particularly to retractor 10 with tensionless apparatus 18, which provides a tensionless or tension-relieving mode, which maintains belt 12 against the wearer with a finite but unnoticeable force. Belt 12 is wound on webbing reel 14, which is mounted on shaft 16, with tension-relieving apparatus 18 mounted at first shaft end 20 for operation with reel 14. Rewind or retraction spring 22 is illustrated at shaft second end 23 to bias reel 14 and belt 12 to the rewound or retracted position, which is considered to be a belt reference position. An emergency locking mechanism 25 is broadly represented in dashed outline with an inertia-type mechanism with pendulum weight 27 mounted on a support bar to actuate and lock retractor mechanism 10 against belt protraction during a vehicle accident or other sudden deceleration. An emergency-locking mechanism for a seat belt retractor is illustrated and described in U.S. Pat. No. 4,361,294 at FIG. 1.

Figure 2:
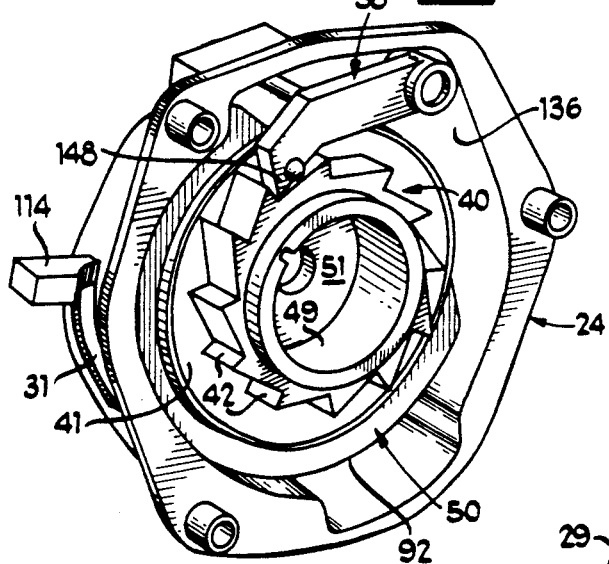
FIG. 2 is an enlarged perspective view of the tension-relieving apparatus at the tensionless position.
Figure 3:
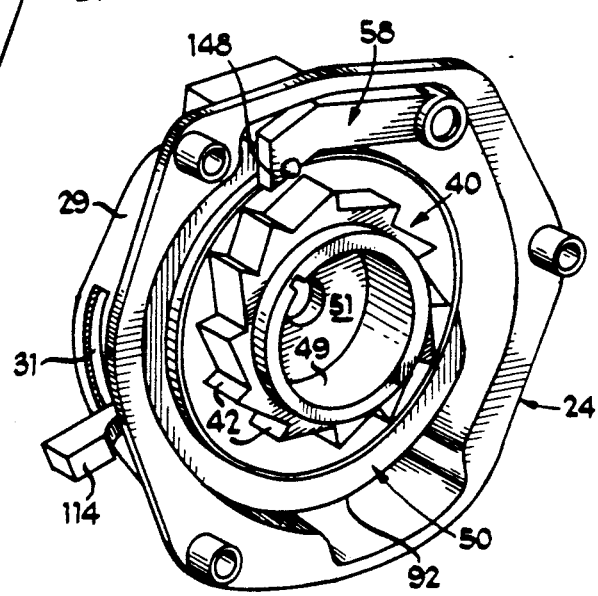
FIG. 3 is an enlarged perspective view of the apparatus in FIG. 2 at the reference and belt-retracting position.

Tensionless or tension-relieving apparatus 18 is operable to provide retractor system 10 at a belt-secured position while abating the retractive force applied to belt 12 by retraction spring 22 to a predetermined force level, which is adequate to lightly maintain belt 12 against the occupant's body. In FIG. 6, tension-relieving device 18 is mounted on retractor sidewall 21 at first shaft end 20. The showing in FIG. 6 of the tension relieving device 18 does not include the disc members shown in FIGS. 7-10, this omission being to more clearly show the interconnection between the shaft end 20 and the ratchet. Tensionless mechanism 18 is operable between a tensionless or engaged mode with pawl 58 engaging ratchet teeth 42, as noted in FIG. 2, for abating the belt retractive force, and a disengaged position (cf. FIG. 3) with pawl 58 displaced from teeth 42 for application of the full retractive force of bias spring 22 to belt 12. Actuating or invoking tensionease device 18 reduces the application of the total bias force of spring 22 over a short protraction distance of belt 12. Earlier tensionease operators generally utilized a mechanism resulting in the complete blockage of the bias spring force, which produced the above-noted general looseness or slack in belt 12.

In the preferred embodiment of tensionease apparatus 18 shown in FIGS. 2-15, housing or cover 24 is generally circular in shape, with a cavity 26 for the tensionease mechanism operating members. Central mounting post 32 for a ratchet member or wheel 40 extends inwardly in cavity 26 normal to surface 36 at central cavity location 30. Ratchet member 40 shown in FIGS. 11 and 12 is mountable and rotatable on post 32 and has a plurality of ratchet teeth 42 at its circumference for engagement by pawl or securing means 58 to initiate the tensionease mode against the rewinding bias force of bias spring 22. Annulus 34 similarly protrudes from surface 36 around post 32 for mounting of annular rotatable unlocking disc 38 in cavity 26.

Locking disc or first rotatable member 50 is rotatably mounted in cavity 26 by means of a ratchet hub 45 extending through disc central bore 94. Disc 50 is rotatable to initiate the tensionease mode and to provide the memory for tensionease device 18. As shown in FIGS. 9 and 10, disc 50 has front surface 90, circumference 92, back surface 96 and tab 98, which extends normal to front surface 90. Annular wall 102 extends from back surface 96 and has inner rim 103 for frictional engagement and travel with contact edge 39 of ratchet flange 41. Arcuate slot or window 100 along circumference 92 is matable with or provides clearance for an extending pawl stud 141 to permit engagement of pawl 58 with ratchet teeth 42 in the tensionease mode. Up ramp 105 allows smooth camming of pawl stud 141 from window arcuate base 101 at the tensionease mode to the circumference 92 at the disengaged or memory position of pawl 58. Window 100 provides the limits of the tensionease mode per se, however, the "memory" of apparatus 18 provided along circumference 92 allows recovery of the tensionease mode after protraction of belt 12 a short distance less than a predetermined amount required to reengage the reference mode. The combination of the tensionease mode and the memory cooperate to provide the comfort system of the tension-relieving apparatus 18. After actuation, the belt-applied retractive force in the tensionease mode is reduced to the above-noted negligible level. The "tensionease" mode is automatically actuable up to belt protraction below the predetermined memory distance where the retractive spring bias force is reapplied and the tensionease apparatus is disengaged.

Unlocking disc 38 shown in FIGS. 7 and 8 is annularly shaped and has circumference 108, outer surface 104 and a central through-bore 106 for mounting on and rotation about annulus 34. Recess or arcuate track 113 in disc inner surface 112 is provided as a track for receiving locking disc tab 98 between disc inner surface 112 and sidewall 109, and is displaced from surface 112. The arc-length of recess 113 terminates at first end 115 and second end 117, which ends are positioned adjacent the ends of a groove or slot 122 at circumference 108. The ends 115 and 117 are engageable by tab 98 to rotate unlocking disc 38. Groove 122 has shoulder 124, base 126 and sloped ramp 128 extending from base 126 to circumference 108. The groove 122 is alignable with arcuate window 100 of locking disc 50 to receive pawl stud 141 and allow engagement of pawl 58 with ratchet wheel 40 to activate the tensionease mode. An arcuate slot 119 is provided through inner surface 112 at through-bore 106 with an arc-shaped flexible arm 121 extending into slot 119. Knob 123 at the end of arm 121 protrudes into through-bore 106 to contact outer surface 35 of annulus 34 and engage annulus notches 37 and 39 to positively locate and retain unlocking disc 38 at its alternative positions to avoid inadvertent disengagement of either the tensionease or reference modes.

A lug 114 of unlocking disc 38 extends generally radially outward from circumference 108 and has a passage 135 for coupling to an external actuator, such as a cable, to move unlocking disc 38 to the disengaged position upon the occurrence of an external event. Lug 114 extends through arc-slot 31 in housing sidewall 29 for coupling to an external actuator for rotation of unlocking disc 38 about annulus 34. A typical example of an external actuator is a spring-loaded cable 150 shown in FIG. 1 coupled to an automobile door frame 17 and operable at door opening to rotate unlocking disc 38 counterclockwise as shown in FIG. 4 to move pawl stud 141 along ramp 128 out of slot 122 and onto circumference 108. This disc rotation disengages the tensionease mode and reestablishes the reference mode with the full force of belt retractive spring 22 acting to rewind belt 12 on reel 14.

As illustrated by the exploded assembly view of FIG. 4, unlocking disc 38 has through-bore 106 mated on annulus 34 in cavity 26. Disc spring or washer 52, which has a generally centered aperture 53 for mounting on ratchet hub 45, is positioned between unlocking disc inner surface 112 and locking disc front surface 90 to bias locking disc 50 against ratchet wheel 40 and onto shaft end 20. During rotation of disc 50, the locking tab 98 travels within recess 113 to contact first and second recess ends 115, 117 for rotating and positioning unlocking disc 38 at the tensionease mode or to disengage the tensionease mode after exceeding the predetermined allowable belt protraction of the tensionless memory.

Pawl 58 as shown in FIGS. 15 and 16 has a dogleg shape with a throughbore 130 at one end for pivotable mounting on mounting stud 134, which extends normal to inner surface 36 in cavity 26 at housing sidewall 136. Pawl end 148 opposite throughbore 130 is engageable with ratchet teeth 42 to initiate the tensionease mode at the mating of pawl stud 141 with window 100 and slot 122, which pawl stud extends normal to pawl rear face 59. Bead 143 on pawl front face 61 is in sliding engagement with sidewall 21 to maintain pawl 58 aligned on stud 134.

Ratchet wheel 40 as noted above has teeth 42 for engagement with pawl end 148 to actuate the tensionease mode. Ratchet-wheel hub 45 has bore 44 for rotational mounting on post 32, which hub 45 and flange 41 secure locking disc 50, spring washer 52 and unlocking disc 38 in cavity 26. Locking disc 50 is biased against flange 41 by washer 52 to frictionally couple disc 50 and ratchet wheel 40 at disc tapered rim 103 and sloped wheel surface 39, respectively, for rotation of disc 50 with ratchet wheel 40. Ratchet teeth 42 are circularly arranged on flange face 47 to generally circumscribe annulus 65 with an inner diameter 49, which annulus 65 and hub 45 cooperate to provide a pocket 51 for shaft end 20 and torsional coil spring 55. Coil spring 55 has a plurality of loops defining a passage 57 and a radially outward extending finger 59 at one of the spring ends, which finger 59 nests in pocket 63 of annulus 65 to couple spring 55 and ratchet wheel 40. Spring 55 is frictionally mounted on a collar 20a press fitted on the shaft end 20. The collar 20a is positioned within passage 57 and frictionally engages spring 55. This mated combination of the spring 55 and collar 20a is positioned in ratchet pocket 51 with finger 59 nested in pocket 63 to rotationally drive ratchet wheel 40 during belt protraction. Coil spring 55 is tightly wound or winds on collar 20a during belt protraction. However, the direction of shaft rotation during belt retraction causes the spring 55 to loosen on collar 20a so that there is relative movement between collar 20a and spring 55.

In the initial or reference position tensionease device 18 is released and inactive. Door-operated unlocking disc 38 has slot 122 positioned beneath pawl stud 141, and reel spring 22 is continuously biasing belt 12 to the rewound or retracted position on reel 14. At this reference position, locking disc tab 98 contacts unlocking disc recess first end 115 and pawl stud 141 rides on locking disc circumference 92 to maintain pawl 58 and, more specifically, pawl end 148 disengaged from ratchet teeth 42. Thus ratchet wheel 40 and shaft end 20 are freely rotatable in cavity 26 to allow protraction and retraction of belt 12 without hindrance.

During belt protraction coil spring 55 and ratchet wheel 40, which is coupled to spring 55 at finger 59, rotate with shaft 16 in a counterclockwise direction as shown in FIG. 4. Simultaneously, the frictional engagement of ratchet wheel 40 and locking disc 50 rotates tab 98 in recess 113 to contact second unlocking-disc recess end 117 to rotate unlocking disc 38 and slot 122 into a position displaced counterclockwise as viewed in FIGS. 3 and 4 from the pawl-stud receiving position. At securement of belt 12 across the occupant, belt 12 is released and rewound on reel 14 tightly across the occupant's body with the full bias force of retraction spring 22, which is about 12 newtons, applied to belt 12. Rewinding belt 12 rotates shaft 16, ratchet wheel 40 and locking disc 50 clockwise as shown in FIG. 4 to move tab 98 against recess first end 115, which positions slot 122 into pawl stud receiving position with stud 141 again riding on cam or circumference 92 of the locking disc 50. Protraction of belt 12 a short distance, an exemplary distance may be one inch, after securement and rewinding on reel 14 rotates the tensionease apparatus 18 and lock-control disc window 100 into alignment with slot 122 to receive pawl stud 141 and to actuate the tensionease mode.

The slight belt protraction, that is about one inch, more specifically moves locking disc 50 a short arc distance and positions window 100 in alignment with slot 122 to receive pawl-stud 141, which allows engagement of pawl end 148 with ratchet teeth 42 to actuate the tensionease mode by inhibiting the biasing force of belt retraction spring 22. As noted above, coil spring 55 is loosened slightly on collar 20a on shaft end 20 during rewinding of belt 12. In the tensionease mode, coil spring 55 applies a friction force of about 8 newtons, as an example, on shaft end 20, which force acts to lessen the effectiveness of the applied force from retraction spring 22 of about 12 newtons acting in a belt retractive direction. The resultant force acting on both shaft 16 and belt 12 is a belt retractive force of about 4 newtons, which is a force adequate to apply a retractive force on the belt to maintain it against the occupant's body without slack, but so small as to be unnoticeable. The resultant force on the occupant is provided by the "slip" of shaft end 20 in coil spring 55 resulting from the retractive force opening spring 55 to allow shaft slip, which resultant force may be considered an easing of the tension on belt 12 rather than a complete negation of the retracting force of spring 22.

The tensionease mode is specifically operable during the arc distance travel of stud 141 in window 100 and it is maintainable at belt 12 protraction over a predetermined range of about 4 to 6 inches by the "memory" of disc 50. Locking disc 50 allows belt 12 to be protracted during normal occupant movement in the vehicle below this predetermined belt protraction range by rotation of locking disc 50 to move pawl stud 141 along window base 101 and up ramp 105 to circumference 92. This slip action disengages pawl 58 from teeth 42 and again applies the full retractive force of rewind spring 22 to shaft 16 by allowing ratchet wheel 40 to freely rotate in cavity 26, although there is some frictional sliding engagement between locking disc 50 and ratchet wheel 40 at flange edge 39. Locking disc tab 98 concurrently rotates in recess 113 and upon belt protraction beyond the predetermined range, tab 98 contacts recess end 117 and rotates unlocking disc 38 to the disengaged position, which will maintain pawl stud 141 on unlocking disc circumference 108 and disengages the tensionease apparatus. However, occupant movement protracting belt 12 less than the predetermined distance allows locking disc 50 and tab 98 to rotate back to the tensionease state with the window 100 and slot 122 aligned and thus allows pawl stud 141 to track cam surface 105 on locking disc circumference 92 to again nest in the aligned window 100 and slot 122 to automatically reengage the tensionease mode. Inadvertent disengagement of the tensionease mode by excess occupant movement is a minor inconvenience, as the occupant may reinitiate the tensionease mode merely allowing belt retraction by returning to the desired seated position and thereafter protracting belt 12 the required short distance to activate the tensionease mode.

The spring 55 functions as a one-way clutch between the shaft 16 and the ratchet 40, locking these two parts together for rotation as a unit on belt protraction. Upon belt retraction the spring 55 is selectively loosened in its engagement with collar 20a, at which time spring 55 applies a load or force in opposition to the retraction force of the spring 22. It is this frictional force applied as spring 55 slides in its engagement with collar 20a that produces the tensionease mode as described above.

While only specific embodiments of the invention have been described and shown, it is apparent that various alterations and modifications can be made therein. It is therefore the intention in the appended claims to cover all such modifications and alterations as may fall within the scope and spirit of the invention.

What is claimed is:

1. In a seat belt retractor for rewinding a seat belt, said retractor comprising:
   a housing defining an enclosure:
   a shaft extending through said housing and said enclosure;
   a reel for said belt mounted on said shaft in said enclosure;
   an emergency locking means for locking the belt retractor against protraction during rapid deceleration;
   a retraction spring for retracting and rewinding said belt on said reel, said retracting spring operable to apply a retraction spring force to said shaft and belt;
   a tension-relieving mechanism including a ratchet wheel mounted on the shaft,
   a pawl pivotally mounted to move between a first position engageable with the ratchet wheel to stop rotation of the ratchet wheel with rotation of the shaft and a second position clear of the ratchet wheel in which the ratchet wheel rotates with the shaft, and
   a coil spring ;mounted about the reel shaft and serving as a one-way slip clutch between the ratchet wheel and the shaft to couple the shaft and ratchet wheel against relative movement when the belt is being protracted and the one-way slip clutch slipping and allowing the shaft to turn and retract slack in the belt with the coil spring clutching force being less than the retraction spring force and being subtracted therefrom when the pawl prevents the ratchet wheel from rotating.

2. A seat belt retractor as claimed in claim 1 wherein said coil spring includes a central passage;
   said shaft includes a first end and a second end,
   said retraction spring for retracting is coupled to said first end,
   said coil spring is mounted on and frictionally engages said second end;
   said belt protractable from said reel and securable across an occupant at a first and taut position to apply said retraction force across said occupant,
   said coil spring tightly wound on said shaft at belt protraction and applying the coil spring clutching force on said shaft in opposition to said retraction spring force when the pawl engages the ratchet wheel.

3. A belt retractor as claimed in claim 2 wherein said retraction spring force and said coil spring clutching force cooperate to provide a third force operable to maintain said belt against said occupant with a retractive force less than four newtons.

4. A belt retractor as claimed in claim 2 wherein said pawl engages said ratchet wheel to actuate said tension-relieving mechanism by a belt protraction of about one inch after securement of said occupant.

5. The retractor as claimed in claim 4 wherein said tension-relieving mechanism has a memory apparatus operable to allow belt protraction below a predetermined distance to maintain said tension-relieving mechanism activated, and deactivation of said tension-relieving mechanism at belt protraction above said predetermined distance.

6. In a seat belt retractor for rewinding a seat belt, said retractor comprising:

a housing defining an enclosure:

a shaft extending through said housing and said enclosure and having a first and second end;

a reel for said belt mounted on said shaft in said enclosure;

an emergency locking means for locking the belt retractor against protraction during rapid deceleration;

means for retracting and rewinding said belt on said reel, said retracting means coupled to said first end to apply a first retracting force to said shaft and belt;

said belt protractable from said reel and securable across an occupant at a first and taut position to apply said retraction force across said occupant;

means for relieving at least some of said first retracting force applied by the belt onto the body of an occupant in a vehicle, said means for relieving operable between a disengaged position and an engaged position and operable to apply a second force to said shaft in a belt-protracting direction at said engaged position, which second force is less than said retracting first force, to reduce the effect of said retracting first force on the shaft and occupant at said engaged position, and said means for relieving having a ratchet wheel rotatably mounted on the shaft with a plurality of teeth on the circumference of an annulus defining a pocket;

said means for relieving includes a coil spring positioned in said pocket and having a central passage, a first spring end, a second spring end and an arm at one of said first and second spring ends;

said coil spring mounted on and frictionally engaging said second end of the shaft and being tightly wound on said shaft at belt protraction and applying said second force on said shaft in opposition to said retraction force at said tension-relieving means engaged position; and said coil-spring arm extending generally radially outward from said longitudinal axis to engage said annulus and couple said shaft to said ratchet wheel.

7. A tension-relieving means for a seat belt retractor assembly, which assembly has a belt, a housing with an enclosure, a shaft extending through said housing and enclosure and having a first end and a second end, means for retracting said belt mounted on one of said shaft first and second ends to rewind said belt in said enclosure;

said tension-relieving means comprising:

a casing having an inner wall and a sidewall cooperating to define a cavity;

a central post extending from said inner wall and a stub shaft extending from said inner wall and normal to said inner wall adjacent said sidewall;

an annular projection mounted on said inner wall around said central post;

an unlocking disc with a periphery, a generally central throughbore and a peripheral slot which disc is mountable and rotatable on said annular projection for rotation between tension-relieving means disengaged and engaged positions;

a lock control disc with a second periphery, a peripheral notch and a central passage generally alignable with said unlocking disc throughbore, said notch and unlocking disc slot alignable at said tension-relieving-means engaged position;

a ratchet wheel having a hub with an annular sidewall, a first end, and a second end, a base with a mounting aperture at said first end and a radially extending flange at the second end, an annulus extending away from said flange and said second end and having an inner surface and an outer surface, said inner surface having an inner-surface notch and defining a pocket, a plurality of ratchet teeth on said outer surface;

a retaining washer with a mounting passage;

said lock control disc mounted on said hub of the ratchet wheel, which hub extends through said washer passage and is rotatably mounted on said central post with said washer biasing said lock control disc into contact with said ratchet flange;

a coil spring positionable in said ratchet wheel has a first spring end, a second spring end, and a longitudinal axis, which spring defines a passage for said other shaft end along said axis, an arm at one of said first and second spring ends radially extending from said longitudinal axis, and engageable with said notch in said ratchet wheel;

a pawl having a follower stud and a throughbore for rotatable mounting on said stub shaft, said pawl stud is nested in said aligned unlocking disc slot and lock control disc notch at the engaged position and said pawl contacting said ratchet teeth to secure said ratchet wheel and coil spring from retractive rotation with said shaft, which spring applies a frictional force against said shaft to reduce the retractive force on said belt and occupant at said engaged position.

8. A tension-relieving means as claimed in claim 7 wherein said unlocking disc has an inner surface, an outer surface contacting said housing inner surface, said slot in said periphery of said unlocking disc having a first cam surface and a second cam surface extending from said periphery to said slot, said unlocking disc defining an arcuate track recessed on said inner surface, with a first recess end and a second recess end;

said lock control disc having an inner face and an outer face, a tracking pin extending from said outer face and matable with said unlocking disc arcuate track;

said means for retracting operable to apply a first retractive force to said shaft and belt;

said coil spring at said engaged position contracting and tightly grasping said shaft in opposition to belt retraction with a second force less than the first retraction force of said retraction means, which coil spring and means for retracting cooperate to provide a belt-applied third retractive force at the engaged position less than said first retractive force.

9. A tension-relieving means as claimed in claim 7 further comprising said casing sidewall defines a port;

said unlocking disc having a lug extending through said port;

means for remotely actuating said unlocking disc coupled to said lug, which remote actuating means is operable in response to an external action to rotate said unlocking disc to disengage said tension-relieving means.

10. A tension-relieving means as claimed in claim 7 wherein said coil spring is operable to cooperate with said means for retracting to provide a reduced retractive force of about four newtons.

11. In a seat belt retractor for rewinding a seat belt, said retractor comprising:

a housing defining an enclosure;

a shaft having a first end and a second end, and extending through said housing and enclosure;

an emergency locking means for locking the belt against protraction upon detection of a predetermined acceleration;

a first spring coupled to one of said first and second ends to bias said shaft and belt to a rewound and reference state;

means for relieving at least some of the bias applied by said first spring to the belt and onto the body of an occupant in a vehicle, said relieving means having a ratchet wheel mounted on the shaft, a pawl pivotally mounted to move between a first position engageable with the ratchet wheel to stop rotation of the ratchet wheel with rotation of the shaft and a second position clear of the ratchet wheel in which the ratchet wheel rotates with the shaft, a second spring mounted on the other of said shaft first and second ends, which second spring is coupled to the ratchet wheel and frictionally retained on said shaft and operable between a first and expanded position at belt retraction and a second and contracted position during belt protraction, and means to selectively engage the pawl with the ratchet wheel to restrain said ratchet wheel and said second spring to provide a frictional force on said shaft at a tension-relieving mode in an opposed direction to rewinding of said shaft and belt to allow said shaft to slip and reduce the rewinding force on said belt and occupant.

12. The combination as claimed in claim 11, said ratchet wheel further comprising a hub and a recess therein;

said hub having a notch;

said second spring having a generally radially extending arm which is matable with said notch to couple said shaft and said ratchet wheel.

* * * * *

UNITED STATES PATENT AND TRADEMARK OFFICE
CERTIFICATE OF CORRECTION

PATENT NO. : 5,265,823
DATED : November 30, 1993
INVENTOR(S) : Doty

It is certified that error appears in the above-indentified patent and that said Letters Patent is hereby corrected as shown below:

IN THE CLAIMS:

Column 8, Line 32, change the comma to a semi-colon.

Column 8, Line 38, change the comma to a semi-colon.

Column 8, Line 39, after "spring" delete ";" (semi-colon).

Column 8, Line 51, change the comma to a semi-colon.

Column 8, Line 53, change the comma to a semi-colon.

Column 8, Line 58, change the comma to a semi-colon.

Column 9, Line 14, change the colon to a semi-colon.

Column 10, Line 31, change the comma to a semi-colon.

Signed and Sealed this

Twenty-fourth Day of May, 1994

Attest:

BRUCE LEHMAN

*Attesting Officer*   *Commissioner of Patents and Trademarks*